United States Patent
Pei et al.

(10) Patent No.: US 11,327,186 B2
(45) Date of Patent: May 10, 2022

(54) SUBMARINE SEISMIC MONITORING APPARATUS AND SYSTEM BASED ON SUBMARINE INTERNET OF THINGS

(71) Applicants: THE FIRST INSTITUTE OF OCEANOGRAPHY, MNR, Shandong (CN); SHANDONG UNIVERSITY OF SCIENCE AND TECHNOLOGY, Shandong (CN)

(72) Inventors: Yanliang Pei, Qingdao (CN); Baohua Liu, Qingdao (CN); Pengyao Zhi, Qingdao (CN); Guangming Kan, Qingdao (CN); Chenguang Liu, Qingdao (CN)

(73) Assignees: THE FIRST INSTITUTE OF OCEANOGRAPHY, MNR, Shandong (CN); SHANDONG UNIVERSITY OF SCIENCE AND TECHNOLOGY, Shandong (CN)

( * ) Notice: Subject to any disclaimer, the term of this patent is extended or adjusted under 35 U.S.C. 154(b) by 361 days.

(21) Appl. No.: 16/603,043

(22) PCT Filed: Sep. 27, 2018

(86) PCT No.: PCT/CN2018/107802
§ 371 (c)(1),
(2) Date: Oct. 4, 2019

(87) PCT Pub. No.: WO2020/051950
PCT Pub. Date: Mar. 19, 2020

(65) Prior Publication Data
US 2020/0257009 A1    Aug. 13, 2020

(30) Foreign Application Priority Data
Sep. 12, 2018 (CN) .................. 201811063041.X (51) Int. Cl.
*G01V 1/16* (2006.01)
*B63B 22/00* (2006.01)
(Continued)

(52) U.S. Cl.
CPC .............. *G01V 1/168* (2013.01); *B63B 22/00* (2013.01); *G01V 1/181* (2013.01); *G01V 1/226* (2013.01);
(Continued)

(58) Field of Classification Search
CPC ................... G01V 1/168; G01V 1/008; G01V 2210/1427; G01V 1/20; B63B 22/00; B63B 2211/02
See application file for complete search history.

(56) References Cited

U.S. PATENT DOCUMENTS 6,932,185 B2 * 8/2005 Bary ..................... G01V 1/16
181/110
8,279,714 B2 * 10/2012 Paul ..................... F16L 11/08
367/173

(Continued)

FOREIGN PATENT DOCUMENTS

| CN | 1424592 A | 6/2003 |
|---|---|---|
| CN | 105738951 A | 7/2016 |

(Continued)

OTHER PUBLICATIONS

International Search Report (in Chinese) issued in PCT/CN2018/107802, dated Jun. 26, 2019; ISA/CN.

*Primary Examiner* — Ian J Lobo
(74) *Attorney, Agent, or Firm* — Harness, Dickey & Pierce, P.L.C.

(57) ABSTRACT

The present invention discloses a submarine seismic monitoring apparatus and system based on the submarine Internet of things. A sea surface buoy network device and a subma-
(Continued)

rine network device in the monitoring apparatus are connected by using an anchor system; the submarine network device and a submarine seismic detection device are connected by using a submarine photoelectric composite cable; there are one or more submarine seismic detection devices; the sea surface buoy network device includes a satellite transceiver apparatus, an Internet of things platform server, a network time server, and an autonomous energy supply apparatus; the submarine network device includes a photoelectric separation cabin, a submarine server, a bottom anchor weight block, and a mechanical releaser; and the submarine seismic detection device includes multiple submarine seismometer network nodes, where the multiple submarine seismometer network nodes are successively connected in series end to end by using the submarine photoelectric composite cable. The apparatus and system in the present invention not only can be used for submarine structure detection, but also can be used for earthquake disaster and tsunami warning, and can implement autonomous energy supply, long timing, and unattended operation.

18 Claims, 8 Drawing Sheets

(51) Int. Cl.
*G01V 1/18* (2006.01)
*G01V 1/22* (2006.01)
*H04L 67/12* (2022.01)

(52) U.S. Cl.
CPC ........ *H04L 67/12* (2013.01); *B63B 2022/006* (2013.01); *G01V 2210/1427* (2013.01)

(56) References Cited

U.S. PATENT DOCUMENTS

| | | |
|---|---|---|
| 2003/0117893 A1 | 6/2003 | Bary |
| 2005/0105392 A1 | 5/2005 | Martin et al. |
| 2008/0048881 A1 | 2/2008 | Safinya et al. |
| 2012/0087206 A1 | 4/2012 | Thompson et al. |
| 2015/0331126 A1 | 11/2015 | Lambert et al. |

FOREIGN PATENT DOCUMENTS

| | | |
|---|---|---|
| CN | 107076867 A | 8/2017 |
| CN | 107179554 A | 9/2017 |

\* cited by examiner

SUBMARINE SEISMIC MONITORING APPARATUS AND SYSTEM BASED ON SUBMARINE INTERNET OF THINGS

CROSS-REFERENCE TO RELATED APPLICATIONS

This application is the U.S. National Phase Application under 35 U.S.C. 371 of International Application No. PCT/CN2018/107802 filed on Sep. 27, 2018. This application claims priority to Chinese Patent Application No. 201811063041.X, filed with the Chinese Patent Office on Sep. 12, 2018 and entitled "SUBMARINE SEISMIC MONITORING APPARATUS AND SYSTEM BASED ON SUBMARINE INTERNET OF THINGS". The disclosures of both of the above applications are incorporated herein by reference in their entirety.

TECHNICAL FIELD

The present invention relates to the field of seismic detection technologies, and in particular, to a submarine seismic monitoring apparatus and system based on the submarine Internet of things.

BACKGROUND

A submarine seismograph is a high and new submarine detection technology developed in recent 50 years, and has been widely used in the fields of scientific research of a submarine structure, submarine seismic monitoring, marine oil and gas resource exploration, and the like. A current submarine seismograph uses a self-contained self-sinking/floating structure. The device is arranged at a sea bottom to collect data, and collected data is stored in the device in a self-contained manner, and the data can be read only after the device is recovered. This submarine seismograph can only be used for submarine structure detection, and cannot be used in the disaster prevention field such as earthquake disaster and tsunami warning.

SUMMARY

Based on this, it is necessary to provide a submarine seismic monitoring apparatus and system based on the submarine Internet of things that not only can be used for submarine structure detection, but also can be used for earthquake disaster and tsunami warning.

To achieve the above purpose, the present invention provides the following technical solutions.

A submarine seismic monitoring apparatus based on the submarine Internet of things includes a sea surface buoy network device, a submarine network device, an anchor system, and a submarine seismic detection device, where the sea surface buoy network device floats on a sea surface, and both the submarine network device and the submarine seismic detection device are arranged at a sea bottom; there are one or more submarine seismic detection devices; the sea surface buoy network device and the submarine network device are connected by using the anchor system; and the submarine network device and the submarine seismic detection device are connected by using a submarine photoelectric composite cable;

the sea surface buoy network device includes a satellite transceiver apparatus, an Internet of things platform server, a network time server, and an autonomous energy supply apparatus, where both the satellite transceiver apparatus and the network time server are communicatively connected to the Internet of things platform server; the satellite transceiver apparatus communicates with a shore-based network control center by using a satellite; the autonomous energy supply apparatus is connected to both the satellite transceiver apparatus and the network time server; the Internet of things platform server is configured to monitor and manage the submarine seismic detection device, send, to the sea surface satellite transceiver apparatus, a received seismic signal uploaded by the submarine seismic detection device, and send, to the submarine seismic detection device, a received control instruction sent by the sea surface satellite transceiver apparatus; the network time server is configured to provide a clock signal for the submarine seismic detection device by using the Internet of things platform server; and the autonomous energy supply apparatus is configured to provide a power signal for the satellite transceiver apparatus, the network time server, and the submarine network device;

the submarine network device includes a photoelectric separation cabin, a submarine server, a bottom anchor weight block, and a mechanical releaser, where the photoelectric separation cabin is connected to both the anchor system and the submarine seismic detection device, and is configured to provide a high-voltage power signal for the submarine seismic detection device and send, to the sea surface buoy network device, a received seismic signal sent by the submarine seismic detection device; the submarine server is connected to the photoelectric separation cabin, and is configured to cooperate with the Internet of things platform server for monitoring and managing the submarine seismic detection device; and the bottom anchor weight block is connected to the anchor system by using the mechanical releaser, and is configured to fasten the submarine network device to the sea bottom; and the submarine seismic detection device includes multiple submarine seismometer network nodes, where the multiple submarine seismometer network nodes are successively connected in series end to end by using the submarine photoelectric composite cable; the submarine seismometer network node includes a data transmission short-connection part and a submarine seismograph module; the data transmission short-connection part is connected to the submarine seismograph module; the data transmission short-connection part is configured to reduce a voltage of the high-voltage power signal and conduct photovoltaic conversion on a received signal; and the submarine seismograph module is configured to sense submarine vibration and detect and generate a seismic signal.

Preferably, the monitoring apparatus further includes an underwater wireless sensor, and the underwater wireless sensor is wirelessly connected to the submarine network device, and is configured to collect underwater acoustic data and wirelessly transmit the underwater acoustic data to the submarine network device.

Preferably, the sea surface buoy network device further includes a buoy floating body, a tower frame, a navigation mark, and a target sensing network camera;

the tower frame is disposed on the buoy floating body, and the satellite transceiver apparatus, the Internet of things platform server, the network time server, the autonomous energy supply apparatus, the navigation mark, and the target sensing network camera are disposed on the tower frame;

the navigation mark is configured to broadcast a number and location information of the sea surface buoy network device; and the target sensing network camera is connected to the Internet of things platform server, and is configured to automatically sense passing ships, conduct camera shooting on the ships, and automatically upload a captured image to the Internet of things platform server.

Preferably, the anchor system includes a sea surface connection piece, a photovoltaic conversion cavity, a submarine bearing connection piece, an armor photoelectric composite cable, and an anchor system floating body;

the photovoltaic conversion cavity and the submarine bearing connection piece are respectively connected to two ends of the armor photoelectric composite cable; the anchor system floating body is located on a side, close to the submarine bearing connection piece, of the armor photoelectric composite cable; the sea surface connection piece mechanically connects the photovoltaic conversion cavity to the sea surface buoy network device; the submarine bearing connection piece mechanically connects the mechanical releaser of the submarine network device to the armor photoelectric composite cable; and the photovoltaic conversion cavity is configured to convert a power signal provided by the autonomous energy supply apparatus to a high-voltage power signal and transmit the high-voltage power signal to the submarine network device, and is further configured to conduct photovoltaic conversion on a received signal.

Preferably, the submarine network device further includes a photoelectric hybrid connector assembly, a wet-plug photoelectric connector assembly, and a wireless network interface, where the photoelectric hybrid connector assembly is configured to connect the anchor system to the photoelectric separation cabin; the wet-plug photoelectric connector assembly is configured to connect the submarine seismic detection device to the photoelectric separation cabin; and the wireless network interface is configured to wirelessly connect to the underwater wireless sensor.

Preferably, the submarine seismometer network node further includes a submarine hydrophone module, and the submarine hydrophone module and the data transmission short-connection part are configured to sense vibration of seawater.

Preferably, the submarine seismograph module includes a seismic sensor, a first signal conditioning and conversion circuit, a first processor, a fiber-optic gyroscope north seeker, and an attitude sensor, where there are three seismic sensors, and each seismic sensor is connected to the first signal conditioning and conversion circuit; the first signal conditioning and conversion circuit, the fiber-optic gyroscope north seeker, and the attitude sensor are all connected to the first processor; the first signal conditioning and conversion circuit is configured to conduct conditioning and analog-digital conversion on a received signal to obtain a seismic signal; the fiber-optic gyroscope north seeker is configured to obtain azimuth information; the attitude sensor is configured to obtain a pitch angle and a roll angle; and the first processor is configured to transmit the seismic signal, the azimuth information, the pitch angle, and the roll angle to the data transmission short-connection part.

Preferably, the submarine hydrophone module includes a hydrophone, a second signal conditioning and conversion circuit, and a second processor, where the hydrophone is configured to obtain an analog vibration signal of seawater; the second signal conditioning and conversion circuit is connected to both the hydrophone and the second processor, and is configured to conduct conditioning and conversion on the analog vibration signal of the seawater to obtain a seawater vibration signal, and transmit the seawater vibration signal to the second processor; and the second processor is configured to transmit the seawater vibration signal to the data transmission short-connection part.

Preferably, the sea surface connection piece includes a cardan-joint connection piece and a bearing electric slip ring; the cardan-joint connection piece mechanically connects a buoy floating body of the sea surface buoy network device to one end of the bearing electric slip ring; and the other end of the bearing electric slip ring is connected to the photovoltaic conversion cavity.

A submarine seismic monitoring system based on the submarine Internet of things, including multiple above monitoring apparatuses, where a tail end of any submarine seismic detection device in each monitoring apparatus is connected to an adjacent monitoring apparatus.

Compared with the prior art, beneficial effects of the present invention lie in:

The present invention proposes a submarine seismic monitoring apparatus and system based on the submarine Internet of things. A sea surface buoy network device and a submarine network device in the monitoring apparatus are connected by using an anchor system; the submarine network device and a submarine seismic detection device are connected by using a submarine photoelectric composite cable; the sea surface buoy network device includes a satellite transceiver apparatus, an Internet of things platform server, a network time server, and an autonomous energy supply apparatus; the submarine network device includes a photoelectric separation cabin, a submarine server, a bottom anchor weight block, and a mechanical releaser; and the submarine seismic detection device includes multiple submarine seismometer network nodes, where the multiple submarine seismometer network nodes are successively connected in series end to end by using the submarine photoelectric composite cable. The present invention not only can be used for submarine structure detection, but also can be used for earthquake disaster and tsunami warning; the autonomous energy supply apparatus is disposed to implement autonomous energy supply, long timing, and unattended operation; and the network time server is disposed to implement network timing, so as to resolve a clock drift problem of a self-contained self-sinking/floating submarine seismograph.

BRIEF DESCRIPTION OF THE DRAWINGS

The present invention will be explained in detail with reference to the accompanying drawings.

DETAILED DESCRIPTION

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

To make objectives, features, and advantages of the present invention more comprehensible, the following describes the present invention in more detail with reference to accompanying drawings and specific implementations.

Figure 1:
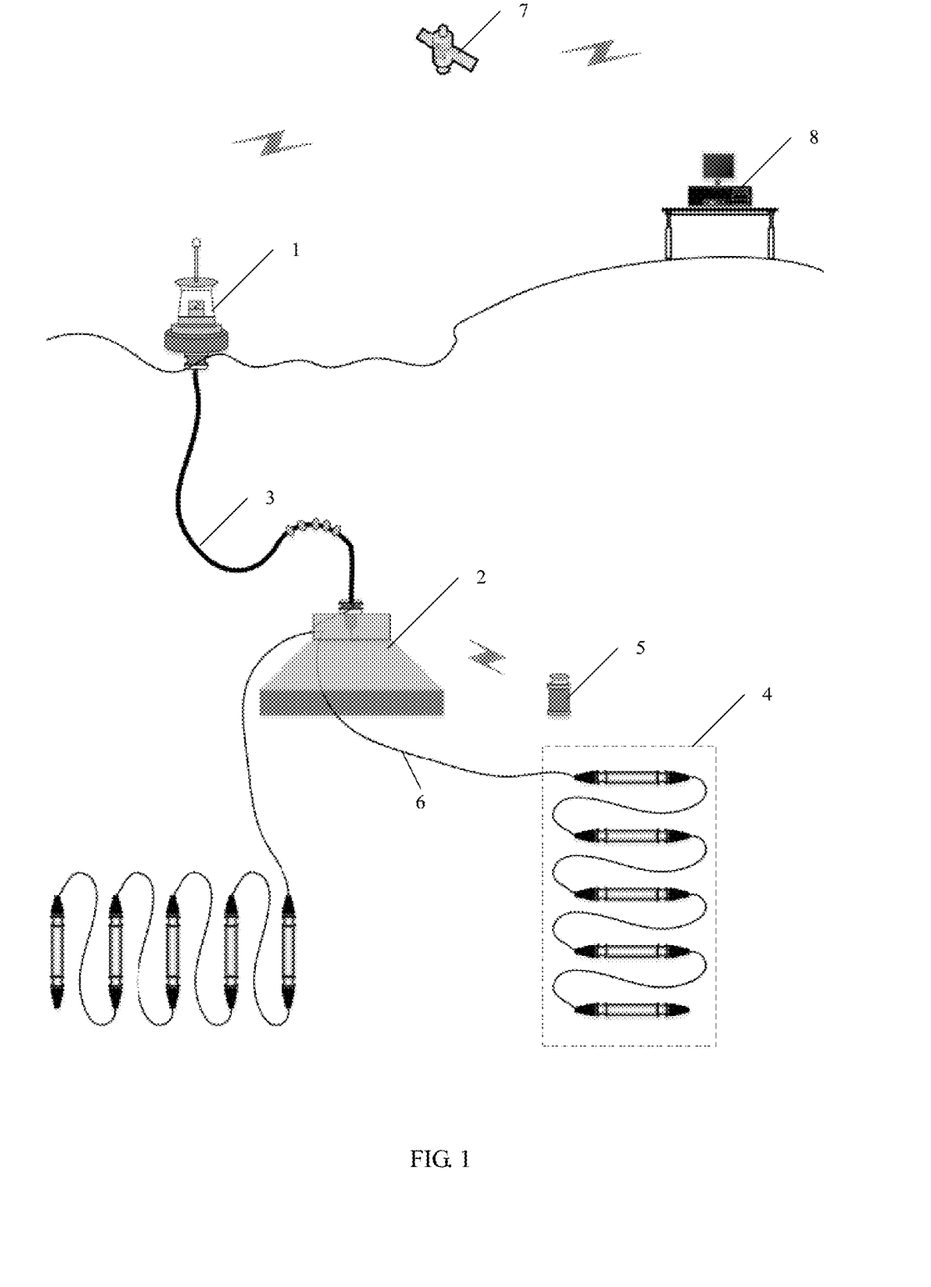
FIG. 1 is a schematic structural diagram of a submarine seismic monitoring apparatus based on the submarine Internet of things according to an embodiment of the present invention.

FIG. 1 is a schematic structural diagram of a submarine seismic monitoring apparatus based on the submarine Internet of things according to an embodiment of the present invention.

Referring to FIG. 1, the submarine seismic monitoring apparatus based on the submarine Internet of things in this embodiment includes a sea surface buoy network device 1, a submarine network device 2, an anchor system 3, a submarine seismic detection device 4, and an underwater wireless sensor 5, where the sea surface buoy network device 1 floats on a sea surface, and both the submarine network device 2 and the submarine seismic detection device 4 are arranged at a sea bottom; there are one or more submarine seismic detection devices 4; the sea surface buoy network device 1 and the submarine network device 2 are connected by using the anchor system 3; the submarine network device 2 and the submarine seismic detection device 4 are connected by using a submarine photoelectric composite cable 6; and the underwater wireless sensor 5 is wirelessly connected to the submarine network device 2, and is configured to collect underwater acoustic data and wirelessly transmit the underwater acoustic data to the submarine network device 2.

The Sea Surface Buoy Network Device 1

Figure 2:
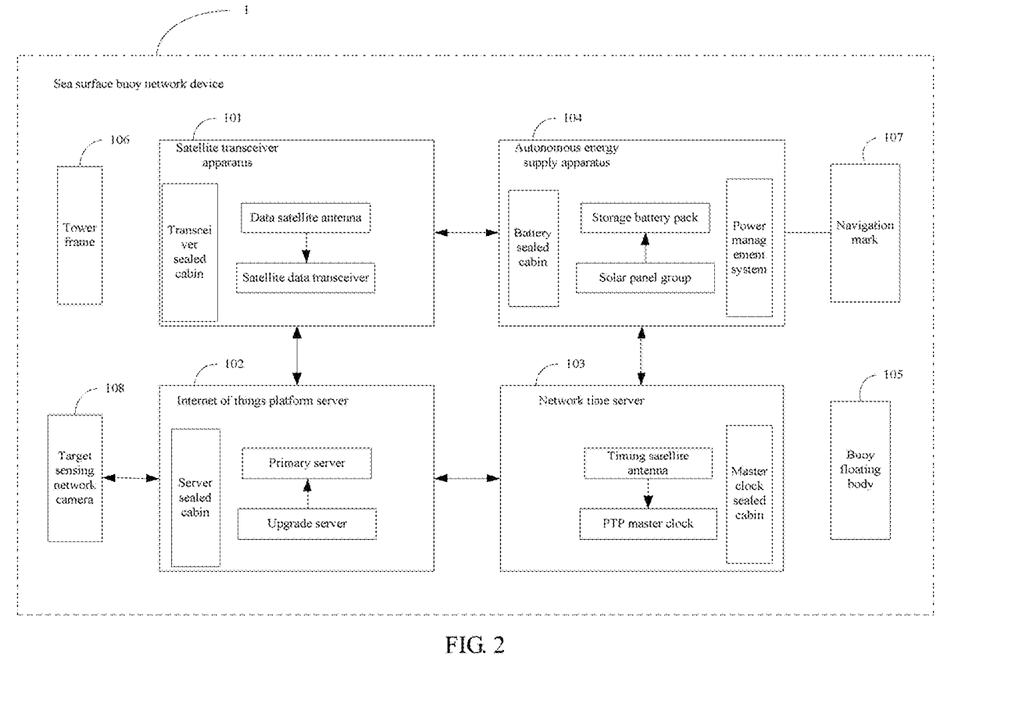
FIG. 2 is a structure block diagram of a sea surface buoy network device according to an embodiment of the present invention.

FIG. 2 is a structural block diagram of a sea surface buoy network device according to an embodiment of the present invention. Referring to FIG. 2, the sea surface buoy network device 1 includes a satellite transceiver apparatus 101, an Internet of things platform server 102, a network time server 103, and an autonomous energy supply apparatus 104, where both the satellite transceiver apparatus 101 and the network time server 103 are communicatively connected to the Internet of things platform server 102; the satellite transceiver apparatus 101 communicates with a shore-based network control center 8 by using a satellite 7; the autonomous energy supply apparatus 104 is connected to both the satellite transceiver apparatus 101 and the network time server 103; the Internet of things platform server 102 is configured to monitor and manage the submarine seismic detection device 4, send, to the sea surface satellite transceiver apparatus 101, a received seismic signal uploaded by the submarine seismic detection device 4, and send, to the submarine seismic detection device 4, a received control instruction sent by the sea surface satellite transceiver apparatus 101; the network time server 103 is configured to provide a clock signal for the submarine seismic detection device 4 by using the Internet of things platform server 102; and the autonomous energy supply apparatus 104 is configured to provide a power signal for the satellite transceiver apparatus 101, the network time server 103, and the submarine network device 2.

The satellite transceiver apparatus 101 includes a data satellite antenna, a satellite data transceiver, and a transceiver sealed cabin. The satellite transceiver apparatus 101 may send, to the shore-based network control center 8 by using the satellite 7, seismic data collected by the submarine seismic detection device 4 and status data of the submarine seismic detection device 4. The data satellite antenna and the satellite data transceiver may be one or a combination of current common low-orbit satellite data transceiver devices such as the iridium satellite, the Beidou satellite, and the silk road satellite. The transceiver sealed cabin is configured to bear the satellite data transceiver to protect it from being corroded by seawater.

The Internet of things platform server 102 includes a primary server, an upgrade server, and a server sealed cabin. The primary server has a high processing capability and a large storage capacity, and is configured to monitor and manage the submarine seismic detection device 4 and the underwater wireless sensor 5, collect and store data uploaded by the submarine network device 2, and forward the data to the satellite transceiver apparatus 101. The upgrade server is configured to: when a submarine seismic detection device 4 or a periphery sensor is newly added, automatically recognize the newly added device or newly added sensor, so that the Internet of Things can be upgraded and updated. The server sealed cabin is configured to bear the primary server and the upgrade server to protect them from being corroded by seawater.

The network time server 103 includes a PTP master clock, a timing satellite antenna, and a master-clock sealed cabin. The PTP master clock uses the IEEE1588 standard (a full name is "standard for a precision clock synchronization protocol for network measurement and control systems"), uses the GPS satellite or the Beidou satellite as a clock reference source, supports several thousands of PTP slave clocks, and may provide an accurate clock for each submarine seismic detection device 4, so as to ensure that the entire submarine seismic monitoring apparatus has uniform millisecond-level clock precision. The timing satellite antenna is a necessary accessory of the PTP master clock, and is configured to receive a GPS satellite timing signal or a Beidou satellite timing signal. The master-clock sealed cabin is configured to bear the PTP master clock to protect it from being corroded by seawater.

The autonomous energy supply apparatus 104 includes a solar panel group, a storage battery pack, a power management system, and a battery sealed cabin. The solar panel group may be one or a combination of multiple solar panels, and the solar panel group can charge the storage battery pack in the daytime. The storage battery pack may be one or a combination of multiple storage batteries, and the storage battery supplies power for the submarine seismic monitoring apparatus. The power management system manages charging and discharging of the storage battery pack to avoid overcharge and overdischarge of the storage battery pack, so as to prolong a battery life. The battery sealed cabin is configured to bear the storage battery pack and the power management system to protect them from being corroded by seawater.

In an optional implementation, the sea surface buoy network device 1 further includes a buoy floating body 105, a tower frame 106, a navigation mark 107, and a target sensing network camera 108, where the tower frame 106 is disposed on the buoy floating body 105, and the satellite transceiver apparatus 101, the Internet of things platform server 102, the network time server 103, the autonomous energy supply apparatus 104, the navigation mark 107, and the target sensing network camera 108 are disposed on the tower frame 106; the navigation mark 107 is configured to broadcast a number and location information of the sea surface buoy network device 1 from a vhf channel to ships in a near water area, so that adjacent ships can grasp in time dynamic/static information of a sea surface buoy network platform and adopt a necessary collision avoidance action, so as to ensure ship safety and safety of the sea surface buoy network device 1; and the target sensing network camera 108 is connected to the Internet of things platform server 102, and is configured to automatically sense passing ships, conduct camera shooting on the ships, and automatically upload a captured image to the Internet of things platform server 102, to provide information about the passing ships and provide evidence materials when the sea surface buoy network device 1 is damaged.

The buoy floating body 105 provides buoyancy force for a sea surface device. To ensure normal working of the device in an adverse sea condition, an enough margin is required for a displacement of the buoy floating body 105. Preferably, the buoy floating body 105 is made of a polymer foam material, and has a small specific gravity, low water absorption, corrosion resistance, and crashworthiness. Preferably, a surface of the buoy floating body 105 is sprayed with an anti biological adhesion material. A total displacement of the buoy floating body 105 is not less than four tons.

The Submarine Network Device 2

Figure 3:
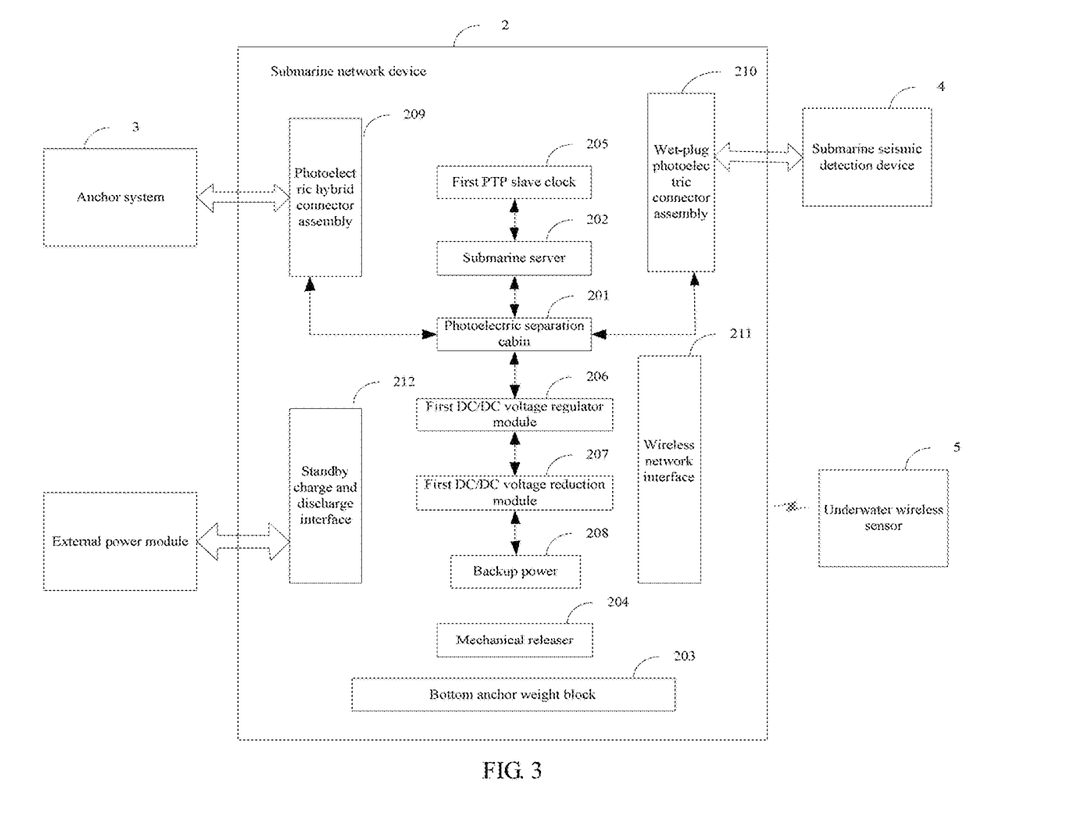
FIG. 3 is a structure block diagram of a submarine network device according to an embodiment of the present invention.

FIG. 3 is a structure block diagram of a submarine network device according to an embodiment of the present invention. Referring to FIG. 3, the submarine network device 2 includes a photoelectric separation cabin 201, a submarine server 202, a bottom anchor weight block 203, and a mechanical releaser 204, where the photoelectric separation cabin is connected to both the anchor system 3 and the submarine seismic detection device 4, and is configured to provide a high-voltage power signal for the submarine seismic detection device 4 and send, to the sea surface buoy network device 1, a received seismic signal sent by the submarine seismic detection device 4; the submarine server 202 is connected to the photoelectric separation cabin 201, and is configured to cooperate with the Internet of things platform server 102 for monitoring and managing the submarine seismic detection device 4; and the bottom anchor weight block 203 is connected to the anchor system 3 by using the mechanical releaser 204, and is configured to fasten the submarine network device 2 to a sea bottom. When the monitoring apparatus is recovered, the mechanical releaser 204 conducts release to separate the anchor system 3 from the bottom anchor weight block 203; and a weight of the bottom anchor weight block 203 in water should be less than a maximum displacement of the buoy floating body 105. Preferably, the weight of the bottom anchor weight block 203 shall not be less than four tons.

The photoelectric separation cabin 201 includes a first optical fiber transceiver module and an Ethernet switch; an optical fiber and a cable in the anchor system 3 enter the photoelectric separation cabin 201 together, and an optical fiber signal sent by the anchor system 3 enters the first optical fiber transceiver module in the photoelectric separation cabin 201; the Ethernet switch is connected to both the first optical fiber transceiver module and the submarine server 202, and is configured to receive the optical fiber signal sent by the first optical fiber transceiver module and send the received optical fiber signal to the submarine server 202.

In an optional implementation, the submarine network device 2 further includes a first PTP slave clock 205, a first DC/DC voltage regulator module 206, a first DC/DC voltage reduction module 207, a backup power 208, a photoelectric hybrid connector assembly 209, a wet-plug photoelectric connector assembly 210, a wireless network interface 211, and a standby charge and discharge interface 212.

The first PTP slave clock 205 is used in combination with the sea surface buoy network device 1, and provides a uniform millisecond-precision clock for an entire network; the first DC/DC voltage stabilizer module 206 receives, from the anchor system 3, a high-voltage power signal transmitted through the photoelectric separation cabin 201, conducts voltage stabilization on the high-voltage power signal, and then provides a power supply for the submarine seismic detection device 4; the first DC/DC voltage reduction module 207 conducts voltage reduction on the high-voltage power signal transmitted from the anchor system, to reach a voltage that can be used by each module unit of the subsea network device 2. Preferably, a voltage of a direct-current power supply provided by the autonomous energy supply apparatus 104 and conveyed to the sea bottom by the anchor system 3 is 200 VDC or higher, and the voltage is reduced to 12 VDC after passing through the first DC/DC voltage reduction module 207; the backup power 208 is a rechargeable battery pack, and supplies power for each module unit of the submarine network device 2 and the submarine seismic detection device 4 when an electric quantity provided by the sea surface buoy network device 1 is insufficient; the photoelectric hybrid connector assembly 209 is configured to connect the anchor system 3 to the photoelectric separation cabin 201; the wet-plug photoelectric connector assembly 210 is used to connect the submarine seismic detection device 4 to the photoelectric separation cabin 201; the wireless network interface 211 is configured to wirelessly connect to the underwater wireless sensor 5; the wireless network interface 211 includes a network coordinator and uses a underwater acoustic communications technology or low-frequency electromagnetic wave communications technology; the standby charge and discharge interface 212 is configured to connect the backup power 208 to an external power module; the external power module may be a power supply for an underwater mobile platform such as an AUV, the external power module may supplement power for the backup power 208, and the backup power 208 may alternatively be configured to charge the external power module.

The photoelectric separation cabin 201 in this embodiment also serves as a collection cabin of the submarine seismic detection device 4, connects to multiple wet-plug photoelectric connector assemblies to provide, for the submarine seismic detection device 4, the high-voltage power signal having passed through the first DC/DC voltage regulator module 206, and collect optical fiber signals from the submarine seismic detection devices 4; the submarine server 202 monitors and manages the submarine seismic detection device 4 and the underwater wireless sensor 5, collects and stores data sent by the submarine seismic detection device 4 and the underwater wireless sensor 5, and transmits the data to the sea surface buoy network device 1 through the photoelectric separation cabin 201, the photoelectric hybrid connector assembly 209, and the anchor system 3.

The Anchor System 3

Figure 4:
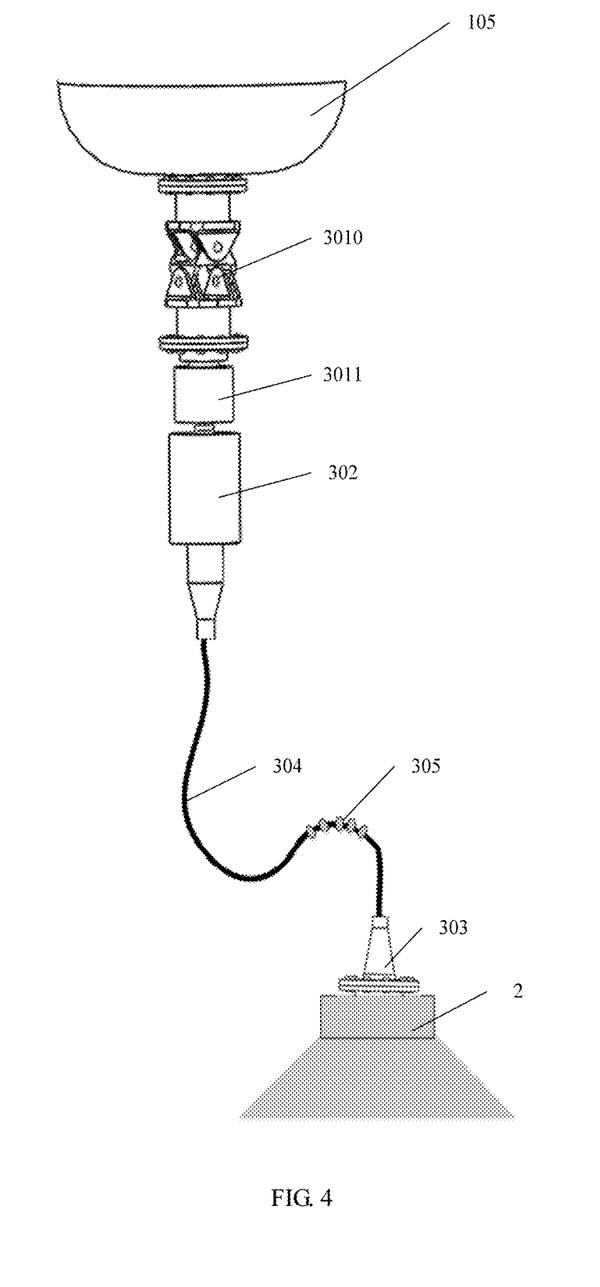
FIG. 4 is a schematic structural diagram of an anchor system according to an embodiment of the present invention.
Figure 5:
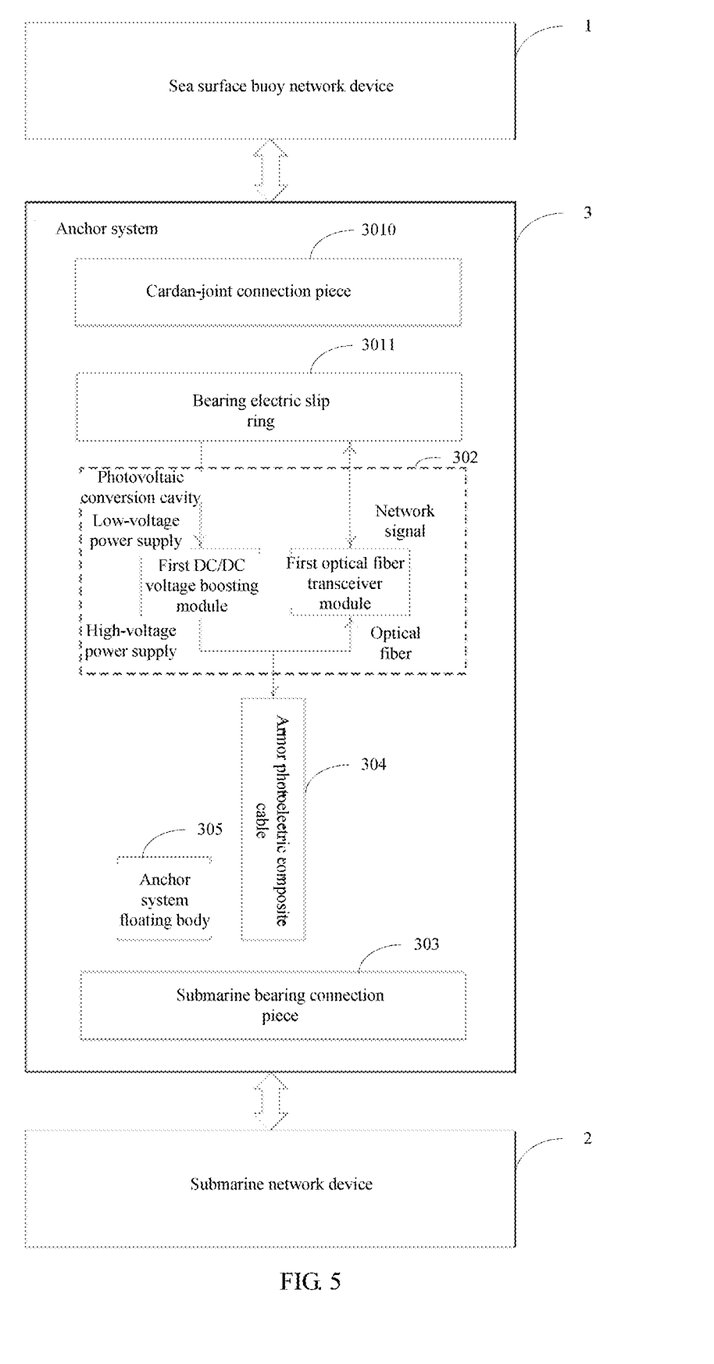
FIG. 5 is a structure block diagram of an anchor system according to an embodiment of the present invention.

FIG. 4 is a schematic structural diagram of an anchor system according to an embodiment of the present invention. FIG. 5 is a structure block diagram of an anchor system according to an embodiment of the present invention. Referring to FIG. 4 and FIG. 5, the anchor system 3 includes a sea surface connection piece 301, a photovoltaic conversion cavity 302, a submarine bearing connection piece 303, an armor photoelectric composite cable 304, and an anchor system floating body 305.

The photovoltaic conversion cavity 302 and the submarine bearing connection piece 303 are respectively connected to two ends of the armor photoelectric composite cable 304; the anchor system floating body 305 is located on a side, close to the submarine bearing connection piece 303, of the armor photoelectric composite cable 304; the sea surface connection piece 301 mechanically connects the photovoltaic conversion cavity 302 to the sea surface buoy network device 1; the submarine bearing connection piece 303 mechanically connects the mechanical releaser 204 of the submarine network device 2 to the armor photoelectric composite cable 304; and the photovoltaic conversion cavity 302 is configured to convert a power signal provided by the autonomous energy supply apparatus 104 to a high-voltage power signal and transmit the high-voltage power signal to the submarine network device 2, and is further configured to conduct photovoltaic conversion on a received signal.

The photovoltaic conversion cavity 302 includes a first DC/DC voltage boosting module and a second optical fiber transceiver module, where the first DC/DC voltage boosting module increases, through the first DC/DC voltage boosting module, a voltage of a low-voltage direct-current power supply provided by the autonomous energy supply apparatus 104, to reduce a loss of long-distance cable transmission. Preferably, the voltage of the low-voltage direct-current power supply provided by the autonomous energy supply apparatus 104 is 12 VDC, and the voltage is increased to 200 VDC or higher after passing through the first DC/DC voltage boosting module; and the second optical fiber transceiver module converts an optical fiber signal and an Ethernet electrical signal to each other, converts, to an Ethernet electrical signal, an optical signal sent from the submarine network device 2 by using the armor photoelectric composite cable 304, and forwards the Ethernet electrical signal to the sea surface buoy network device 1.

The submarine bearing connection piece 303 is configured to mechanically connect the armor photoelectric composite cable 304 to the submarine network device 2, and reinforce a connection between the armor photoelectric composite cable 304 and a terminal near the sea bottom, so as to avoid damage to an armor cable resulting from repeated bending and over-bending.

The armor photoelectric composite cable 304 includes a multi-core optical fiber, a multi-core power cable, a protective layer, an armor layer, and an outer protective layer. Preferably, the multi-core fiber is a single-mode fiber, and has four cores and optical attenuation not more than 0.45 dB/km; the multi-core power cable has six cores, and a conductor direct-current resistance thereof is not greater than 25 Ω/km; the inner protective layer is covered outside a cable core to protect the cable core; the armor layer provides tensile and wear resistance through wire armoring; and the outer protective layer is covered outside the steel wire armor layer to protect the steel wire armor layer from being corroded by seawater. In this embodiment, the armor photoelectric composite cable 304 has safe working load not less than two tons, maximum working load not less than four tons, and breaking force not less than eight tons.

The anchor system floating body 305 is mounted one end of the armor photoelectric composite cable 304 near the sea bottom, to offset a partial weight of the armor photoelectric composite cable 304 in water, to prevent the overlong armor photoelectric composite cable 304 from arriving the bottom. Preferably, the anchor system floating body 305 in the present invention is made of a polymer foam material, and has a small specific gravity, low water absorption, corrosion resistance, and crashworthiness.

In an optional implementation, the sea surface connection piece 301 includes a cardan-joint connection piece 3010 and a bearing electric slip ring 3011; the cardan-joint connection piece 3010 mechanically connects a buoy floating body 105 of the sea surface buoy network device 1 to one end of the bearing electric slip ring 3011, and is configured to reinforce a connection between the armor photoelectric composite cable 304 and a terminal near the sea surface, so as to avoid damage to an armor cable resulting from repeated bending and over-bending; and the other end of the bearing electric slip ring 3011 is connected to the photovoltaic conversion cavity 302, and is configured to transmit a power signal and a seismic signal when the buoy floating body 105 rotates relative to the armor photoelectric composite cable 304.

The Submarine Seismic Detection Device 4

Figure 6:
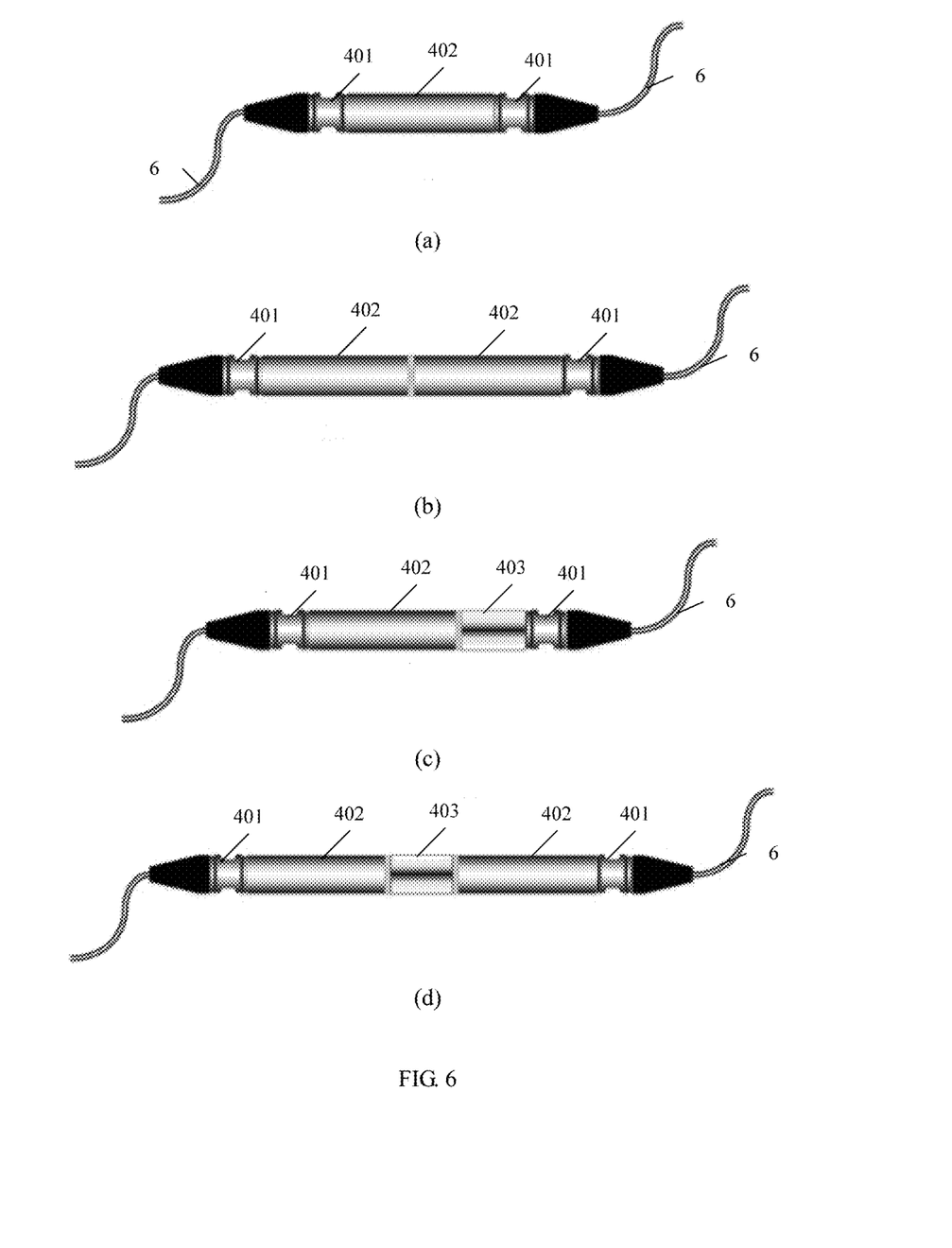
FIG. 6 is a schematic structural diagram of a submarine seismometer network node according to an embodiment of the present invention.

The submarine seismic detection device 4 includes multiple submarine seismometer network nodes, where the submarine seismic detection device 4 uses a streamlined design, and the multiple submarine seismometer network nodes are successively connected in series end to end by using the submarine photoelectric composite cable 6; the submarine seismometer network node includes a data transmission short-connection part 401 and a submarine seismograph module 402; the data transmission short-connection part 401 is connected to the submarine seismograph module 402; the data transmission short-connection part 401 is configured to reduce a voltage of the high-voltage power signal and conduct photovoltaic conversion on a received signal; and the submarine seismograph module 402 is configured to sense submarine vibration and detect and generate a seismic signal. FIG. 6 is a schematic structural diagram of a submarine seismometer network node according to an embodiment of the present invention. Referring to FIG. 6, each multiple submarine seismometer network node includes one or two submarine seismograph modules 402 shown by a diagram (a) and a diagram (b) of FIG. 6.

The data transmission short-connection part 401 includes a DC/DC voltage reduction unit, an optical fiber transceiver unit, and a photoelectric connector assembly, where the DC/DC voltage reduction unit reduces a voltage of a high-voltage power signal transmitted from the submarine network device 2 by using the submarine photoelectric composite cable, to obtain a voltage that can be used by each unit of the submarine seismometer network node. Preferably, the high-voltage power signal transmitted from the submarine network device 2 by using the submarine photoelectric composite cable is 200 VDC or higher, and the voltage is reduced to 12 VDC after passing through the DC/DC voltage reduction unit. The optical fiber transceiver unit converts an optical fiber signal and an Ethernet electrical signal to each other, converts, to an Ethernet electrical signal, an optical signal sent from the submarine network device 2 by using the submarine photoelectric composite cable, and forwards the Ethernet electrical signal to the submarine seismograph module 402, and vice versa. The photoelectric connector assembly is configured to connect the submarine seismometer network node to the submarine photoelectric composite cable, and needs to be able to bear specific tension, so that the submarine seismometer network node can be smoothly arranged in a sea bottom.

Each submarine seismograph module 402 includes three seismic sensors, a first signal conditioning and conversion circuit, a first processor, a fiber-optic gyroscope north seeker, an attitude sensor, an electronic compass, a second PTP slave clock, a first timekeeping module, a first storage array, and a first network communications interface.

The seismic sensor is a high-frequency seismic sensor, a broadband seismic sensor, or an acceleration sensor. Parameters such as frequency bands and sensitivity of the three seismic sensors in the submarine seismograph module 402 are exactly the same. When a submarine seismometer network node includes two submarine seismograph modules 402, two different types of seismic sensors should be selected for the two submarine seismograph modules 402. For example, in one submarine seismometer network node, one submarine seismograph module 402 uses three high-frequency seismic sensors, and the other submarine seismograph module 402 uses three broadband seismic sensors.

The three seismic sensors in the submarine seismograph module 402 are arranged according to three orthogonal coordinate axes: X, Y, and Z. In each conventional self-contained self-sinking/floating submarine seismograph, to ensure that two sensors in an X direction and a Y direction in the three sensors are located on a horizontal plane while a sensor of a Z direction is vertically downward arranged, a leveling apparatus is required. Due to existence of a leveling apparatus, a conventional self-contained self-sinking/floating submarine seismograph is large in size, and a sea bottom/surface inclined angle during arrangement needs to be generally not greater than 15 degrees, and the conventional self-contained self-sinking/floating submarine seismograph is not suitable for cable-type arrangement. The submarine seismograph module 402 in the present invention completely avoids use of a leveling apparatus, and the submarine seismometer network node can be arranged in any direction, and is not limited by the sea bottom/surface inclined angle.

Figure 7:
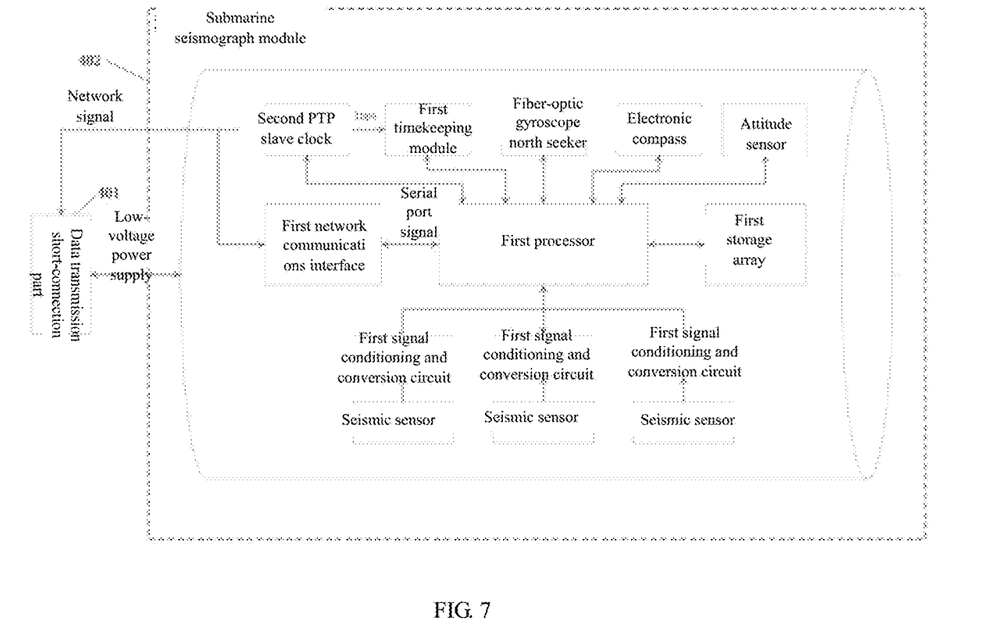
FIG. 7 is a structure block diagram of a submarine seismograph module according to an embodiment of the present invention.

FIG. 7 is a structural block diagram of a submarine seismograph module according to an embodiment of the present invention. Referring to FIG. 7, each seismic sensor in the submarine seismograph module 402 is connected to one first signal conditioning and conversion circuit. The first signal conditioning and conversion circuit, the fiber-optic gyroscope north seeker, the attitude sensor, the electronic compass, the second PTP slave clock, the first timekeeping module, the first storage array, and the first network communications interface are all connected to the first processor. The first signal conditioning and conversion circuit is configured to conduct conditioning and analog-digital conversion on a received signal to obtain a seismic signal. The fiber-optic gyroscope north seeker is configured to obtain azimuth information. The attitude sensor is configured to obtain a pitch angle and a roll angle. The electronic compass is configured to provide azimuth reference information of the submarine seismograph module 402, has precision less than that of the fiber-optic gyroscope north seeker, is susceptible to interference from an external magnetic body (such as an instrument housing), and is used for mutual reference with the fiber-optic gyroscope north seeker. The first processor is configured to transmit the seismic signal, the azimuth information, the pitch angle, and the roll angle to the data transmission short-connection part 401. The first storage array is configured to locally store seismic data measured by the submarine seismograph module 402. Preferably, the first storage array in this embodiment is a storage array formed by multiple eMMC storage chips. The second PTP slave clock is used in combination with a PTP master clock of the sea surface buoy network device 1 to provide a uniform millisecond-precision clock for an entire network. The first timekeeping module uses a high-precision crystal oscillator and a clock chip, and calibrates a time to a UTC standard time by using 1 pps pulse per second sent from the second PTP slave clock as a reference. The first network communications interface converts a serial port signal of the first processor to an Ethernet signal and sends the Ethernet signal to the data transmission short-connection part 401.

In an optional implementation, the submarine seismometer network node further includes a submarine hydrophone module 403, and the submarine hydrophone module 403 and the data transmission short-connection part 401 are configured to sense vibration of seawater, as shown by a diagram (c) and a diagram (d) of FIG. 6.

Figure 8:
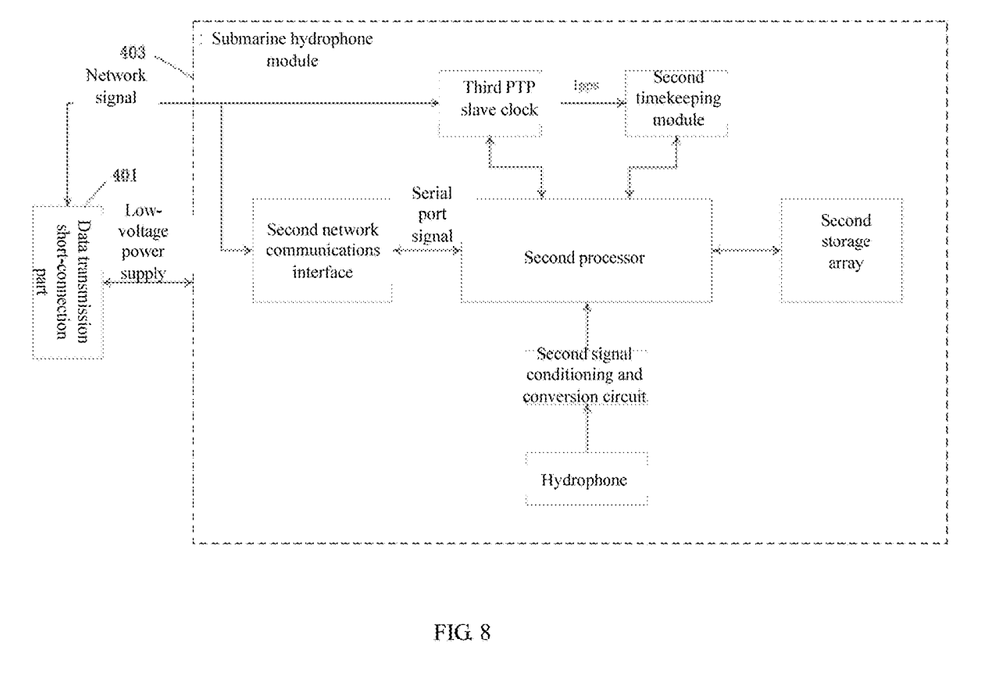
FIG. 8 is a structure block diagram of a submarine hydrophone module according to an embodiment of the present invention.

FIG. 8 is a structural block diagram of a submarine hydrophone module according to an embodiment of the present invention. Referring to FIG. 8, the submarine hydrophone module 403 includes a hydrophone, a second signal conditioning and conversion circuit, a second processor, a third PTP slave clock, a second timekeeping module, a second storage array, and a second network communications interface. The hydrophone is a piezoelectric ceramics hydrophone and uses an oil charge withstand-voltage structure, and is configured to obtain an analog vibration signal of seawater. The second signal conditioning and conversion circuit is connected to both the hydrophone and the second processor, and is configured to conduct conditioning and conversion on the analog vibration signal of the seawater to obtain a seawater vibration signal, and transmit the seawater vibration signal to the second processor. The second processor is configured to transmit the seawater vibration signal to the data transmission short-connection part 401. The third PTP slave clock is used in combination with a PTP master clock in the sea surface buoy network device 1 to provide a uniform millisecond-precision clock for an entire network. The second timekeeping module uses a high-precision crystal oscillator and a clock chip, and calibrates a time to the UTC standard time by using 1 pps pulse per second sent by the third PTP slave clock as a reference. The second network communications interface converts a serial port signal of the second processor to an Ethernet signal and sends the Ethernet signal to the data transmission short-connection part 401.

The Underwater Wireless Sensor 5

There are one or more underwater wireless sensors 5, and the underwater wireless sensor 5 conducts self-contained working, and wirelessly uploads data to a submarine network platform by using an underwater acoustic communications technology or a low-frequency electromagnetic wave communications technology. Optionally, the underwater wireless sensor 5 may be a static sensor or a dynamic sensor, and a dynamic sensor is a sensor carried by an autonomous underwater vehicle (AUV). The underwater wireless sensor 5 may be a submarine seismograph for wireless transmission, or a pressure sensor, an acceleration sensor, a temperature sensor, a density sensor, a salinity sensor, an acidity sensor, a chemical sensor, a conductivity sensor, a pH sensor, an oxygen gas sensor, a hydrogen gas sensor, a dissolved methane sensor, a turbidity sensor, or the like.

In an actual application of the submarine seismic monitoring apparatus based on the submarine Internet of things in the embodiments, the sea surface buoy network device 1 is configured to receive in time data of the submarine seismic detection device 4 and the underwater wireless sensor 5, and send received seismic data and other sensor data to the shore-based network control center 8 by the satellite 7. The sea surface buoy network platform supplies, through a solar panel, power for a device carried by the sea surface buoy network device 1, and transmit a power signal to the submarine network device 2 and the submarine seismic detection device 4 by using the anchor system 3.

The shore-based network control center 8 receives the seismic data and other sensor data sent by the satellite 7, stores the data in a file manner, displays the data in a graphics mode, and publishes the data by using a network.

For transmission of the power signal, the sea surface buoy network device 1 and the submarine network device 2 are connected by using a cable, and the submarine network device 2 and the submarine seismic detection device 4 are also connected by using a cable.

The submarine seismic monitoring apparatus based on the submarine Internet of things in the embodiments has the following advantages:

(1) The monitoring apparatus not only can be used for submarine seismic detection and scientific research of a submarine structure, but also can be used for earthquake disaster and tsunami warning; and can also be used for autonomous energy supply, long timing, and unattended operation.

(2) The submarine seismograph module completely avoids use of a leveling apparatus of a conventional device, and the submarine seismometer network node can be arranged in any direction, and is not limited by a sea surface/bottom inclined angle, so as to be convenient for construction. In addition, the submarine seismometer uses a PTP network for timing; time systems of all nodes in the network is consistent with the world concordant time (UTC), and an error is not greater than 1 ms, completely resolving a clock drift problem of the conventional device.

(3) The submarine network device can be connected to multiple types of underwater wireless sensors, including a wireless sensor carried by an AUV, and has a distributed abundant environment perception capability, so as to form an extensible Internet of Things.

Figure 9:
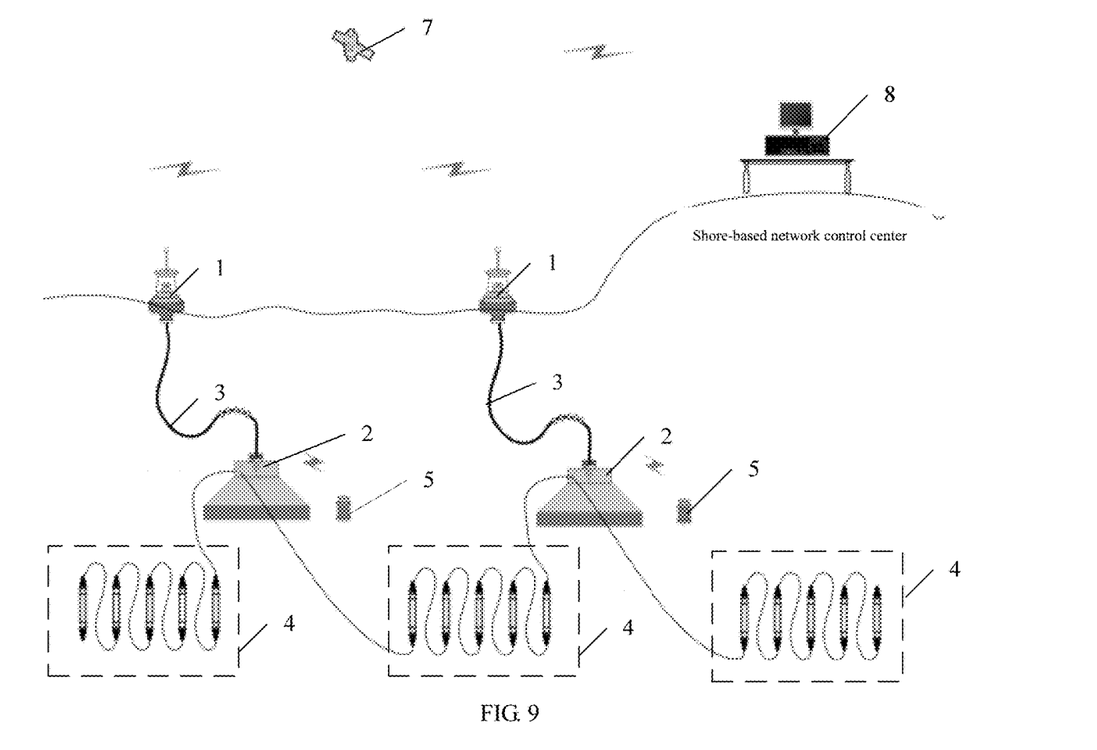
FIG. 9 is a schematic structural diagram of a submarine seismic monitoring system based on the submarine Internet of things according to an embodiment of the present invention.

The present invention further provides a submarine seismic monitoring system based on the submarine Internet of things. FIG. 9 is a schematic structural diagram of a submarine seismic monitoring system based on the submarine Internet of things according to an embodiment of the present invention. Referring to FIG. 9, the monitoring system includes multiple monitoring apparatuses, and an end part of any submarine seismic detection device 4 in each monitoring apparatus is connected to an adjacent monitoring apparatus.

The submarine seismic monitoring system based on the submarine Internet of things not only can be used for submarine structure detection, but also can be used for earthquake disaster and tsunami warning, and can implement autonomous energy supply, long timing, and unattended operation; and resolves a clock drift problem of a self-contained self-sinking/floating submarine seismograph, so as to implement operation in a multi-platform submarine interconnection mode.

The embodiments of the disclosure are described in detail above with reference to the accompanying drawings, but the disclosure is not limited to the above embodiments. Within the knowledge of a person of ordinary skill in the art, various variations can also be made without departing from the spirit of the disclosure.

What is claimed is:

1. A submarine seismic monitoring apparatus comprising:
a sea surface buoy network device, a submarine network device, an anchor system, and a submarine seismic detection device, wherein the sea surface buoy network device floats on a sea surface, and both the submarine network device and the submarine seismic detection device are arranged at a sea bottom;
one or more submarine seismic detection devices; the sea surface buoy network device and the submarine network device are connected by using the anchor system; the submarine network device and the one or more submarine seismic detection devices are connected by using a submarine photoelectric composite cable;
the sea surface buoy network device comprises a satellite transceiver apparatus, a platform server, a network time server, and an autonomous energy supply apparatus, wherein both the satellite transceiver apparatus and the network time server are communicatively connected to the platform server; the satellite transceiver apparatus communicates with a shore-based network control center by using a satellite; the autonomous energy supply apparatus is connected to both the satellite transceiver apparatus and the network time server; the platform server is configured to monitor and manage the submarine seismic detection device, send, to the satellite transceiver apparatus, a received seismic signal uploaded by the submarine seismic detection device, and send, to the submarine seismic detection device, a received control instruction sent by the satellite transceiver apparatus; the network time server is configured to provide a clock signal for the submarine seismic detection device by using the platform server; and the autonomous energy supply apparatus is configured to provide a power signal for the satellite transceiver apparatus, the network time server, and the submarine network device;
the submarine network device comprises a photoelectric separation cabin, a submarine server, a bottom anchor weight block, and a mechanical releaser, wherein the photoelectric separation cabin is connected to both the anchor system and the submarine seismic detection device, and is configured to provide a high-voltage power signal for the submarine seismic detection device and send, to the sea surface buoy network device, a received seismic signal sent by the submarine seismic detection device; the submarine server is connected to the photoelectric separation cabin, and is configured to cooperate with the platform server for monitoring and managing the submarine seismic detection device; and the bottom anchor weight block is connected to the anchor system by using the mechanical releaser, and is configured to fasten the submarine network device to the sea bottom; and the submarine seismic detection device comprises multiple submarine seismometer network nodes, wherein the multiple submarine seismometer network nodes are successively connected in series end to end by using the submarine photoelectric composite cable; the submarine seismometer network node comprises a data transmission short-connection part and a submarine seismograph module; the data transmission short-connection part is connected to the submarine seismograph module; the data transmission short-connection part is configured to reduce a voltage of the high-voltage power signal and conduct photovoltaic conversion on a received signal; and the submarine seismograph module is configured to sense submarine vibration and detect and generate a seismic signal.

2. The submarine seismic monitoring apparatus according to claim 1, wherein the monitoring apparatus further comprises an underwater wireless sensor, and the underwater wireless sensor is wirelessly connected to the submarine network device, and is configured to collect underwater acoustic data and wirelessly transmit the underwater acoustic data to the submarine network device.

3. The submarine seismic monitoring apparatus according to claim 1, wherein the sea surface buoy network device further comprises a buoy floating body, a tower frame, a navigation mark, and a target sensing network camera;

the tower frame is disposed on the buoy floating body, and the satellite transceiver apparatus, the platform server, the network time server, the autonomous energy supply apparatus, the navigation mark, and the target sensing network camera are disposed on the tower frame;

the navigation mark is configured to broadcast a number and location information of the sea surface buoy network device; and the target sensing network camera is connected to the platform server, and is configured to automatically sense passing ships, conduct camera shooting on the ships, and automatically upload a captured image to the platform server.

4. The submarine seismic monitoring apparatus according to claim 1, wherein the anchor system comprises a sea surface connection piece, a photovoltaic conversion cavity, a submarine bearing connection piece, an armor photoelectric composite cable, and an anchor system floating body;

the photovoltaic conversion cavity and the submarine bearing connection piece are respectively connected to two ends of the armor photoelectric composite cable; the anchor system floating body is located on a side, close to the submarine bearing connection piece, of the armor photoelectric composite cable; the sea surface connection piece mechanically connects the photovoltaic conversion cavity to the sea surface buoy network device; the submarine bearing connection piece mechanically connects the mechanical releaser of the submarine network device to the armor photoelectric composite cable; and the photovoltaic conversion cavity is configured to convert a power signal provided by the autonomous energy supply apparatus to a high-voltage power signal and transmit the high-voltage power signal to the submarine network device, and is further configured to conduct photovoltaic conversion on a received signal.

5. The submarine seismic monitoring apparatus according to claim 2, wherein the submarine network device further comprises a photoelectric hybrid connector assembly, a wet-plug photoelectric connector assembly, and a wireless network interface, wherein the photoelectric hybrid connector assembly is configured to connect the anchor system to the photoelectric separation cabin; the wet-plug photoelectric connector assembly is configured to connect the submarine seismic detection device to the photoelectric separation cabin; and the wireless network interface is configured to wirelessly connect to the underwater wireless sensor.

6. The submarine seismic monitoring apparatus according to claim 1, wherein the submarine seismometer network nodes further comprise a submarine hydrophone module, and the submarine hydrophone module and the data transmission short-connection part are configured to sense vibration of seawater.

7. The submarine seismic monitoring apparatus according to claim 1, wherein the submarine seismograph module comprises a seismic sensor, a first signal conditioning and conversion circuit, a first processor, a fiber-optic gyroscope north seeker, and an attitude sensor, wherein there are three seismic sensors, and each seismic sensor is connected to the first signal conditioning and conversion circuit; the first signal conditioning and conversion circuit, the fiber-optic gyroscope north seeker, and the attitude sensor are all connected to the first processor; the first signal conditioning and conversion circuit is configured to conduct conditioning and analog-digital conversion on a received signal to obtain a seismic signal; the fiber-optic gyroscope north seeker is configured to obtain azimuth information; the attitude sensor is configured to obtain a pitch angle and a roll angle; and the first processor is configured to transmit the seismic signal, the azimuth information, the pitch angle, and the roll angle to the data transmission short-connection part.

8. The submarine seismic monitoring apparatus according to claim 6, wherein the submarine hydrophone module comprises a hydrophone, a second signal conditioning and conversion circuit, and a second processor, wherein the hydrophone is configured to obtain an analog vibration signal of seawater; the second signal conditioning and conversion circuit is connected to both the hydrophone and the second processor, and is configured to conduct conditioning and conversion on the analog vibration signal of the seawater to obtain a seawater vibration signal, and transmit the seawater vibration signal to the second processor; and the second processor is configured to transmit the seawater vibration signal to the data transmission short-connection part.

9. The submarine seismic monitoring apparatus according to claim 4, wherein the sea surface connection piece comprises a cardan-joint connection piece and a bearing electric slip ring; the cardan-joint connection piece mechanically connects a buoy floating body of the sea surface buoy network device to one end of the bearing electric slip ring; and an other end of the bearing electric slip ring is connected to the photovoltaic conversion cavity.

10. A submarine seismic monitoring system, comprising multiple monitoring apparatuses according to claim 1, wherein a tail end of any submarine seismic detection device in each monitoring apparatus is connected to an adjacent monitoring apparatus.

11. A submarine seismic monitoring system, comprising multiple monitoring apparatuses according to claim 2, wherein a tail end of any submarine seismic detection device in each monitoring apparatus is connected to an adjacent monitoring apparatus.

12. A submarine seismic monitoring system, comprising multiple monitoring apparatuses according to claim 3, wherein a tail end of any submarine seismic detection device in each monitoring apparatus is connected to an adjacent monitoring apparatus.

13. A submarine seismic monitoring system, comprising multiple monitoring apparatuses according to claim 4, wherein a tail end of any submarine seismic detection device in each monitoring apparatus is connected to an adjacent monitoring apparatus.

14. A submarine seismic monitoring system, comprising multiple monitoring apparatuses according to claim 5, wherein a tail end of any submarine seismic detection device in each monitoring apparatus is connected to an adjacent monitoring apparatus.

15. A submarine seismic monitoring system, comprising multiple monitoring apparatuses according to claim 6, wherein a tail end of any submarine seismic detection device in each monitoring apparatus is connected to an adjacent monitoring apparatus.

16. A submarine seismic monitoring system, comprising multiple monitoring apparatuses according to claim 7, wherein a tail end of any submarine seismic detection device in each monitoring apparatus is connected to an adjacent monitoring apparatus.

17. A submarine seismic monitoring system, comprising multiple monitoring apparatuses according to claim 8, wherein a tail end of any submarine seismic detection device in each monitoring apparatus is connected to an adjacent monitoring apparatus.

18. A submarine seismic monitoring system, comprising multiple monitoring apparatuses according to claim 9, wherein a tail end of any submarine seismic detection device in each monitoring apparatus is connected to an adjacent monitoring apparatus.

* * * * *